W. J. HAMILL.
Trotting Sulky.

No. 210,687. Patented Dec. 10, 1878.

WITNESSES:
Henry N. Miller
C. Sedgwick

INVENTOR:
W. J. Hamill
BY Munn & Co
ATTORNEYS.

UNITED STATES PATENT OFFICE.

WILLIAM J. HAMILL, OF ST. CATHARINES, ONTARIO, CANADA.

IMPROVEMENT IN TROTTING-SULKIES.

Specification forming part of Letters Patent No. 210,687, dated December 10, 1878; application filed September 18, 1878.

*To all whom it may concern:*

Figure 1:
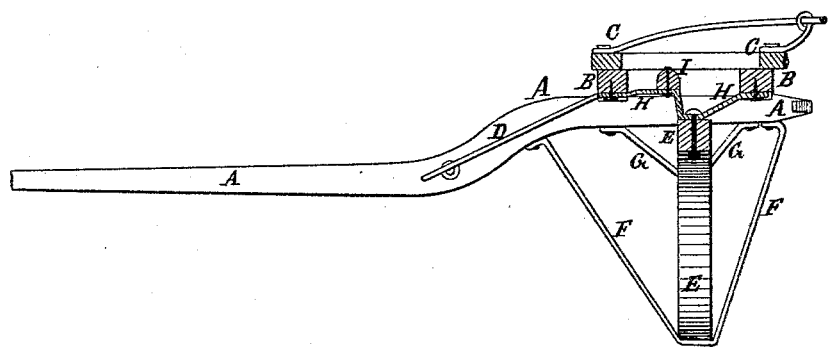
Figure 2:
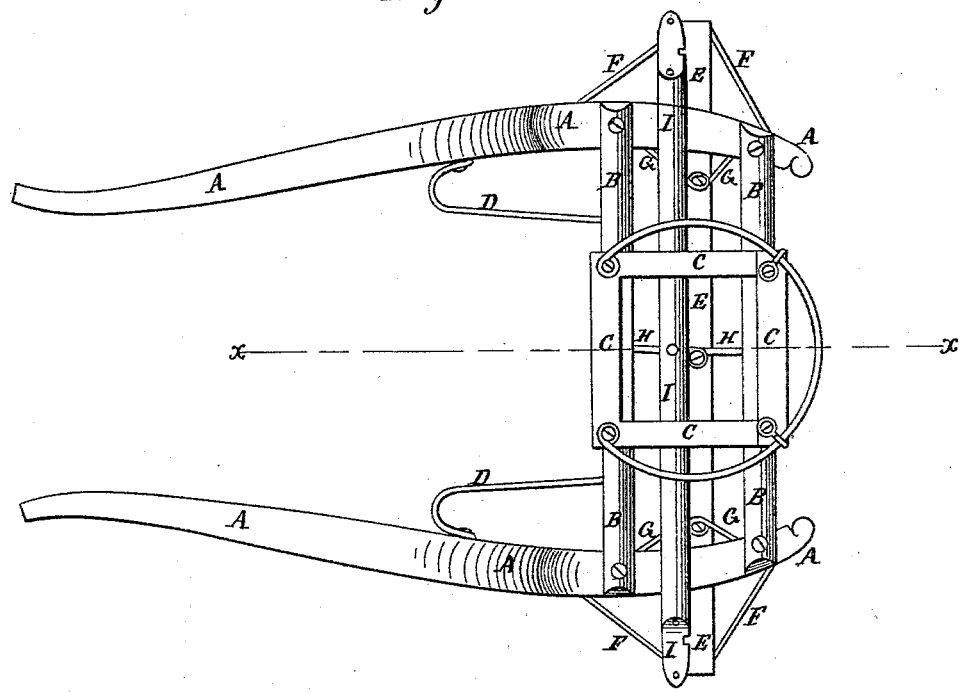

Be it known that I, WILLIAM JOHN HAMILL, of St. Catharines, in the county of Lincoln, Province of Ontario, and Dominion of Canada, have invented a new and useful Improvement in Trotting-Sulkies, of which the following is a specification:

Figure 1 is a vertical longitudinal section of my improved sulky, taken through the line $x$ $x$, Fig. 2. Fig. 2 is a top view of the same.

Similar letters of reference indicate corresponding parts.

The object of this invention is to furnish trotting-sulkies which shall be simpler in construction and less expensive in manufacture than when made in the usual way, and which at the same time will give the horse, when trotting, all the space he needs, and will bring him close back to his work, so that he will be fully under the control of the driver.

The invention consists in a trotting-sulky in which the thills are made with a bend or offset at a little distance from their rear ends, and in a sulky-frame formed by the combination of the bent thills, the two cross-bars, the seat, the foot-rests or stirrups, and the connecting-braces with each other, and with the whiffletree and the arched axle, as hereinafter fully described.

A represents the thills, which are made with an upward bend or offset a little in front of their rear ends, leaving their forward parts and their rear parts horizontal, and their said rear parts at a higher level than their said forward parts, so that the seat does not require to be raised upon iron supports in the usual way.

To the rear parts of the thills A are attached the ends of two parallel cross-bars, B, to the middle parts of which is attached the driver's seat C.

D represents the foot-rests or stirrups, the forward ends of which are attached to the thills A at the forward parts of their bends, and their rear ends are attached to the forward cross-bar, B.

E is the axle, the middle part of which is arched, and the end parts of which are connected with the thills A by the braces F. The axle E is also connected at about the middle part of the arms of its arch with the shafts A by the braces G. The braces F G thus form a firm connection between the axle E and the thills A. This connection is further strengthened by the rod or bar H, the ends of which are attached to the lower side of the cross-bars B, and its middle part is attached to the center of the axle A. The part of the bar H between the axle E and the front cross-bar, B, is bent at a right angle, or nearly so, to bring its forward part into a horizontal position.

To the horizontal part of the bar H, at or near its angle, is pivoted the center of the whiffletree I, which is thus placed between the cross-bars B, and is made of such a length that its ends may project beyond the ends of the cross-bars B, and beyond the thills A.

Having thus described my invention, I claim as new and desire to secure by Letters Patent—

1. A trotting-sulky in which the thills A are made with a bend or offset at a little distance from their rear ends, substantially as herein shown and described.

2. A sulky-frame formed by the combination of the bent thills A, the two cross-bars B, the seat C, the foot-rests or stirrups D, and the connecting-braces F G H with each other, and with the whiffletree I and the arched axle E, substantially as herein shown and described.

WILLIAM JOHN HAMILL.

Witnesses:
R. P. HAMILL,
W. H. FLETCHER.